United States Patent
Wang et al.

(10) Patent No.: US 9,852,648 B2
(45) Date of Patent: Dec. 26, 2017

(54) EXTRACTION OF KNOWLEDGE POINTS AND RELATIONS FROM LEARNING MATERIALS

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 342 days.

(21) Appl. No.: 14/796,838

(22) Filed: Jul. 10, 2015

(65) Prior Publication Data

US 2017/0011642 A1    Jan. 12, 2017

(51) Int. Cl.
| | | |
|---|---|---|
| *G02B 7/00* | (2006.01) | |
| *G09B 7/00* | (2006.01) | |
| *G06F 17/30* | (2006.01) | |
| *G09B 5/00* | (2006.01) | |
| *G06F 17/27* | (2006.01) | |

(52) U.S. Cl.
CPC ......... *G09B 7/00* (2013.01); *G06F 17/30619* (2013.01); *G06F 17/30719* (2013.01); *G06F 17/30734* (2013.01); *G06F 17/30861* (2013.01); *G09B 5/00* (2013.01); *G06F 17/2785* (2013.01)

(58) Field of Classification Search
CPC ......... G06F 17/30719; G06F 17/30619; G06F 17/3007; G06F 17/30917
USPC ....................................................... 434/322
See application file for complete search history.

(56) References Cited

U.S. PATENT DOCUMENTS

| | | | | |
|---|---|---|---|---|
| 8,417,727 B2* | 4/2013 | Slezak | .............. | G06F 17/30595 707/792 |
| 8,521,748 B2* | 8/2013 | Slezak | .............. | G06F 17/30292 707/719 |
| 2001/0032205 A1* | 10/2001 | Kubaitis | .......... | G06F 17/30864 |
| 2002/0087496 A1* | 7/2002 | Stirpe | .................... | G06Q 30/02 706/45 |
| 2003/0144978 A1* | 7/2003 | Zeine | ....................... | G06N 5/04 706/47 |

(Continued)

OTHER PUBLICATIONS

Pedroni, M., Oriol, M., Meyer, B., & Angerer, L. (Mar. 2008). Automatic extraction of notions from course material. In ACM SIGSCE Bulletin (vol. 40, No. 1, pp. 251-255).

(Continued)

*Primary Examiner* — Sam Yao
*Assistant Examiner* — Michael Humphrey
(74) *Attorney, Agent, or Firm* — Maschoff Brennan

(57) ABSTRACT

A method of automated domain knowledge structure generation includes crawling learning materials. The method may include extracting structural information from the learning materials. The method may include extracting knowledge points from the learning materials. The method may include inferring dependency relationships between the knowledge points. The method may include aligning one or more of the knowledge points with one or more of the learning materials. The method may also include generating a domain knowledge structure. The domain knowledge structure may include the extracted knowledge points organized at least partially according to the inferred hierarchy and dependency relationships. The extracted knowledge points may include the aligned learning materials.

20 Claims, 9 Drawing Sheets

(56) References Cited

U.S. PATENT DOCUMENTS

| | | | |
|---|---|---|---|
| 2006/0008789 A1* | 1/2006 | Gerteis | G09B 5/00 434/365 |
| 2006/0020571 A1* | 1/2006 | Patterson | G06F 17/30699 |
| 2007/0136256 A1* | 6/2007 | Kapur | G06F 17/3069 |
| 2010/0190142 A1* | 7/2010 | Gal | G09B 5/00 434/322 |
| 2010/0228693 A1* | 9/2010 | Dawson | G06F 17/2705 706/12 |
| 2010/0241639 A1* | 9/2010 | Kifer | G06F 17/30616 707/754 |
| 2010/0274770 A1* | 10/2010 | Gupta | G06F 17/30598 707/688 |
| 2011/0087956 A1* | 4/2011 | Sherman | G09B 5/00 715/233 |
| 2011/0177480 A1* | 7/2011 | Menon | G09B 7/00 434/238 |
| 2012/0158726 A1* | 6/2012 | Musgrove | G06F 17/30707 707/737 |
| 2013/0095461 A1* | 4/2013 | Menon | G09B 7/00 434/322 |
| 2013/0151954 A1* | 6/2013 | Ierullo | G06F 17/30861 715/254 |
| 2013/0183649 A1* | 7/2013 | Monroe | G06F 17/24 434/322 |
| 2013/0246328 A1* | 9/2013 | Sweeney | G06N 7/005 706/50 |
| 2013/0262242 A1* | 10/2013 | Tateo | G06Q 30/0276 705/14.72 |
| 2013/0339337 A1* | 12/2013 | Alkhateeb | G06F 17/30864 707/710 |
| 2014/0172870 A1* | 6/2014 | Wang | G06F 17/30321 707/741 |
| 2014/0186817 A1 | 7/2014 | Wang et al. | |
| 2014/0188882 A1 | 7/2014 | Wang et al. | |
| 2014/0379601 A1 | 12/2014 | Takahashi | |
| 2015/0006528 A1* | 1/2015 | Rao | G06F 17/30719 707/730 |
| 2015/0072335 A1* | 3/2015 | Pedanekar | G09B 5/02 434/362 |
| 2015/0287047 A1* | 10/2015 | Situ | G06Q 30/0201 705/7.29 |
| 2015/0324459 A1* | 11/2015 | Chhichhia | G06N 7/02 706/12 |
| 2015/0325133 A1* | 11/2015 | Gaglani | G09B 5/06 434/322 |
| 2016/0034305 A1* | 2/2016 | Shear | G06F 9/50 707/722 |
| 2016/0042287 A1* | 2/2016 | Eldardiry | G06F 21/00 706/14 |
| 2016/0050446 A1* | 2/2016 | Fujioka | G06F 17/30867 725/93 |
| 2016/0085850 A1* | 3/2016 | Liang | G06F 17/30979 707/603 |
| 2016/0125751 A1* | 5/2016 | Barker | G06F 17/3053 434/322 |
| 2016/0224893 A1* | 8/2016 | Parker, Jr. | G06F 17/30321 |
| 2016/0379515 A1* | 12/2016 | Okubo | G09B 5/02 434/322 |

OTHER PUBLICATIONS

Du, X., Song, W., & Zhang, M. (2008). A context-based framework and method for learning object description and search. In Advances in Web Based Learning—ICWL 2007 (pp. 114-125). Springer Berlin Heidelberg.

Simko, M., & Bieliková, M. (2009). Automatic Concept Relationships Discovery for an Adaptive E-Course. International Working Group on Educational Data Mining.

Roy, D., Sarkar, S., & Ghose, S. (2008). Automatic extraction of pedagogic metadata from learning content. International Journal of Artificial Intelligence in Education, 18(2), 97-118.

Magistry, P., & Sagot, B. (Jul. 2012). Unsupervized word segmentation: the case for mandarin chinese. In Proceedings of the 50th Annual Meeting of the Association for Computational Linguistics: Short Papers-vol. 2 (pp. 383-387). Association for Computational Linguistics.

Ciaramita, M., Gangemi, A., Ratsch, E., Saric, J., & Rojas, I. (Jul. 2005). Unsupervised Learning of Semantic Relations between Concepts of a Molecular Biology Ontology. In IJCAI (pp. 659-664).

Rink, B., Harabagiu, S., & Roberts, K. (Jan. 2011). Automatic extraction of relations between medical concepts in clinical texts. Journal of the American Medical Informatics Association, 18(5), 594-600.

Takahashi, T., & Larson, R. C. (2012). An Efficient Educational Material Exploration using Extracted Concepts. In CSEDU (1) (pp. 282-287).

* cited by examiner

Lecture Notes

- Lecture notes 1 (ps) (pdf) — Supervised Learning, Discriminative Algorithms
- Lecture notes 2 (ps) (pdf) — Generative Algorithms
- Lecture notes 3 (ps) (pdf) — Support Vector Machines
- Lecture notes 4 (ps) (pdf) — Learning Theory
- Lecture notes 5 (ps) (pdf) — Regularization and Model Selection
- Lecture notes 6 (ps) (pdf) — Online Learning and the Perceptron Algorithm. (optional reading)
- Lecture notes 7a (ps) (pdf) — Unsupervised Learning, k-means clustering
- Lecture notes 7b (ps) (pdf) — Mixture of Gaussians
- Lecture notes 8 (ps) (pdf) — The EM Algorithm
- Lecture notes 9 (ps) (pdf) — Factor Analysis
- Lecture notes 10 (ps) (pdf) — Principal Components Analysis
- Lecture notes 11 (ps) (pdf) — Independent Components Analysis
- Lecture notes 12 (ps) (pdf) — Reinforcement Learning and Control

*FIG. 3B*

EXTRACTION OF KNOWLEDGE POINTS AND RELATIONS FROM LEARNING MATERIALS

FIELD

The embodiments discussed herein are related to extraction of knowledge points and relations from online learning materials.

BACKGROUND

Open education resources generally refer to online learning programs or courses that are made publicly available on the Internet or other public access networks. Examples of open education resources may include e-learning programs, Open Courseware (OCW), Massive Open Online Courses (MOOC), and the like. Participation in an open education program typically allows a learner to access learning materials relating to a variety of topics. The learning materials may include lecture notes, course syllabus, example problems, lecture video recordings, and the like.

Various open education resources are currently offered by a number of educational institutions. The number of educational institutions offering open education resources has increased substantially since the inception of open education a little over a decade ago. With the proliferation of open education resources, there has been a concomitant increase in the number of available learning materials available online.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of automated domain knowledge structure generation includes crawling, by one or more processors, electronic learning materials stored at least temporarily in one or more non-transitory storage media. The method may include extracting, by the one or more processors, structural information from the electronic learning materials. The method may include extracting, by the one or more processors, knowledge points from the electronic learning materials. The method may include inferring, by the one or more processors, hierarchy and dependency relationships between the knowledge points. The method may include aligning, by the one or more processors, one or more of the knowledge points with one or more of the learning materials. The method may also include generating, by the one or more processors, a domain knowledge structure. The domain knowledge structure may include the extracted knowledge points organized at least partially according to the inferred hierarchy and dependency relationships. The extracted knowledge points may include the aligned learning materials.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3B illustrates another example online learning material that may be analyzed in the personalized learning environment of FIG. 1;

DESCRIPTION OF EMBODIMENTS

Figure 1:
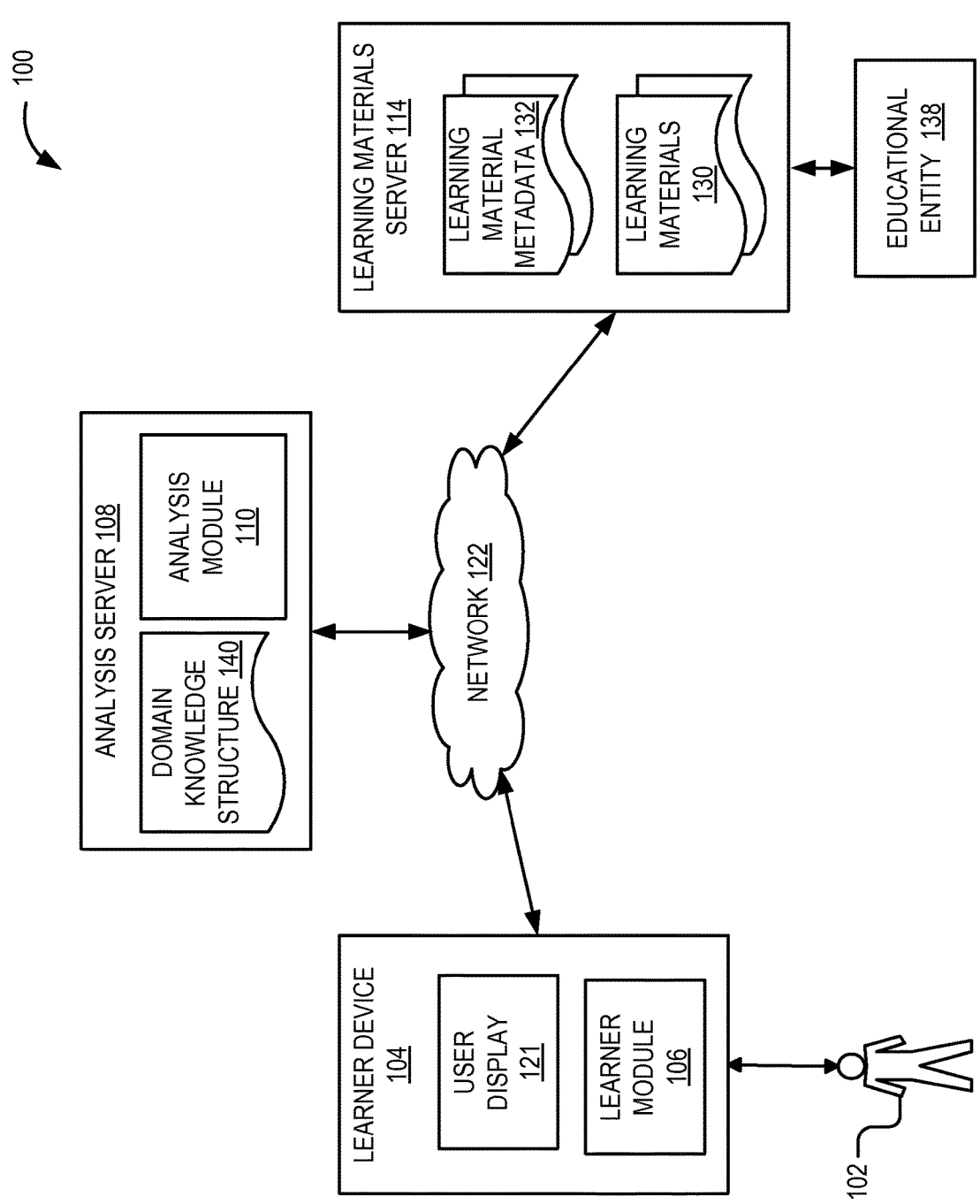
FIG. 1 illustrates a block diagram of an example personalized learning environment in which some embodiments described herein may be implemented.

Learning materials available online have increased of due to the proliferation of open education resources. For example, each course included in an open education resource may include learning materials such as videos, lecture notes, transcripts, test questions, a syllabus, etc. Thus, manual organization (e.g., individuals analyzing and structuring various lecture slides, videos, etc.) of the learning materials has become increasingly difficult.

In addition, the learners who use open education resources may have difficulties finding information related to specific concepts and ascertaining relationships between a specific concept and related concepts. Some educational programs provide learners with manually created organizational structures. These structures may include broad concepts with embedded sub-concepts. However, these structures are often incomplete and poorly-updated due to the effort of manually analyzing and re-analyzing learning materials.

Accordingly, embodiments described herein automatically analyze available learning materials to extract and organize the concepts discussed therein. Many learning materials inherently include structural information that may be helpful to identify concepts discussed in a particular learning material and relationships between discussed concepts. Thus, some embodiments described herein perform an analysis of the learning materials to extract the concepts and determine the relationships between the concepts. By extracting the concepts and the relationships therebetween, the concepts may be organized to allow learners to logically navigate through the concepts and that illustrates relationships between the concepts.

Throughout this application, the term "knowledge point" is used to refer to the "concepts" of the learning materials. The knowledge points of a learning material may include any term or set of words that represent a concept, a notion, an idea, etc. discussed or otherwise presented in the learning material. A knowledge point may include, for instance, the topics, the subtopics, and key terms of the learning materials. For example, a set of learning materials may pertain to a few courses on machine learning. The knowledge points may include topics and subtopics discussed in the courses such as neural networks, statistical inferences, clustering, and structural predictions.

Embodiments described herein generally identify, extract, and organize the knowledge points of learning materials. For example, some embodiments described herein may provide a learning support system which may automatically identify and extract fine-granularity knowledge points and relationships between the knowledge points from massive learning materials. These embodiments may further align the knowledge points with corresponding learning materials and provide links to the learning materials. By aligning the knowledge points with the corresponding learning materials, the learners may be provided with a specific resource that may provide additional information related to the knowledge point.

An example embodiment includes a method of automated domain knowledge structure generation. The domain knowledge structure may include a general organizational structure for the knowledge points. The method may include crawling learning materials and extracting the structural information from the learning materials. The method may also include extracting knowledge points from the learning materials. Hierarchy and dependency relationships between the knowledge points may be inferred and the knowledge points may be aligned with one or more of the learning materials. A domain knowledge structure may then be generated. The domain knowledge structure may include the extracted knowledge points organized at least partially according to the hierarchy and dependency relationships. The aligned learning materials may also be included in the domain knowledge structure. A learner may use the domain knowledge structure to gather information about one or more of the knowledge points and to find relationships between the one or more knowledge points and related knowledge points. Additionally, the learners may be pointed to the learning materials aligned with one or more of the knowledge points. This and other embodiments are described with reference to the appended drawings.

FIG. 1 illustrates a block diagram of an example personalized learning environment (learning environment) 100 in which some embodiments described herein may be implemented. The learning environment 100 may include an analysis server 108 that enables automated generation of a domain knowledge structure 140 from learning materials 130 and learning material metadata 132. The domain knowledge structure 140 may generally include an organized representation of knowledge points extracted from the learning materials 130. The analysis server 108 may be configured to extract the knowledge points and structural information from the learning materials 130 and metadata 132. The analysis server 108 may be configured to generate the domain knowledge structure 140. For example, the domain knowledge structure 140 may be based on the extracted knowledge points and the inferred hierarchy and dependency relationships among the knowledge points. After the domain knowledge structure 140 is generated, a learner 102 may be able to browse the domain knowledge structure 140 to learn a particular knowledge point that may be of interest.

The analysis server 108 may generate the domain knowledge structure 140 without or with minimal action by an individual. For example, manual operations such as reading, evaluating, and relating the learning materials 130, which are generally performed by individuals may be included in operations performed by the analysis server 108.

An example of the domain knowledge structure 140 may include a hierarchy of knowledge points. In the hierarchy, broad (e.g., more general) knowledge points may be included in higher levels of the hierarchy and narrow (e.g., more specific) knowledge points may be included in lower levels of the hierarchy. For example, a broad knowledge point such as "machine learning" may be included in a first level of the hierarchy and a narrow knowledge point such as "supervised learning" and "unsupervised learning" associated with machine learning may be included in a lower level of the hierarchy that is a sub-level of the first level. Thus, the learner 102 who may be interested in "supervised learning" may begin a navigation with a machine learning knowledge point and then may narrow her search to "supervised learning." In other examples, the domain knowledge structure 140 may include an ontology, a cluster diagram, a list, an outline, or any other suitable organizational model.

Additionally, the analysis server 108 may align one or more of the learning materials 130 with a corresponding knowledge point in the domain knowledge structure 140. The aligned learning materials may be linked or referenced in the domain knowledge structure to the corresponding knowledge point. For example, from the example above, a section of a document or portion of a video that includes information related to neural networks may be linked to the neural network knowledge point.

The learning environment 100 of FIG. 1 may include the analysis server 108, a learning materials server 114, and a learner device 104. The learner device 104, the learning materials server 114, and the analysis server 108 may communicate via a network 122. For example, the learner device 104 and the analysis server 108 may communicate the learning materials 130 and the learning material metadata 132 via the network 122.

The network 122 may be wired or wireless, and may have numerous different configurations including a star configuration, a token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

Communication via the network 122 may include actively transmitting data as well as actively accessing data. For example, in some embodiments, the learning materials server 114 may transmit the learning materials 130 to the analysis server 108 via the network 122. Additionally, an analysis module 110 may crawl or otherwise access the learning materials 130 of the learning materials server 114 via the network 122.

The learner 102 may include any individual or entity. In some embodiments, the learner 102 may be participating in an open learning course or may use the learning environment 100 for self-directed education. For example, the learner 102 may interface with the analysis server 108 with the intention of conducting research of a particular topic or for the purpose of learning about the particular topic. Accordingly, in these and other embodiments, the learner 102 may access the domain knowledge structure 140 rather than the learning materials 130 directly because the domain knowledge structure 140 may be better organized and/or more comprehensive than the learning materials 130 as stored on the learning materials server 114.

The learner 102 may access the domain knowledge structure 140 via the learner device 104. The learner device 104 may include a computing device that includes a processor, memory, and network communication capabilities. For example, the learner device 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 122.

The learner device 104 may include a learner module 106. In some embodiments, the learner module 106 may act in part as a thin-client application that may be stored on a computing device, such as the learner device 104, and in part as components that may be stored on the analysis server 108, for instance. In some embodiments, the learner module 106 may be implemented using hardware including a processor, a microprocessor (e.g., to perform or control performance of one or more operations), a field-programmable gate array (FPGA) or an application-specific integrated circuit (ASIC). In some other instances, the learner module 106 may be implemented using a combination of hardware and software.

The learner module may enable interaction between the learner 102 and the analysis server 108. For example, the learner module 106 may be configured to provide a user interface to a user interface device such as a user display 121. The user interface may allow the learner 102 to access the domain knowledge structure 140. In addition, the learner 102 may view the domain knowledge structure 140 or a portion thereof on the user display 121. Additionally, the learner 102 may search for the domain knowledge structure 140 via the learner module 106 using the user interface device. For example, the user display 121 may include input capabilities or reflect user input received by another user input device.

The user display 121 may include any hardware device that receives data and information and generates a visual representation thereof. The user display 121 may additionally be configured to receive user input (e.g., configured as a touchscreen). Some examples of the user display 121 may include a cathode ray tube (CRT) display, a light-emitting diode (LED) display, an electroluminescent display, a liquid crystal display (LCD), or another suitable display.

In FIG. 1, the learner device 104 is separate from the analysis server 108 and the learner module 106 included in the learner device 104 enables the learner 102 to access the analysis server 108. In some embodiments, the learner 102 may interface directly with the analysis server 108 rather than using the learner module 106. Additionally or alternatively, the learner device 104 may be used by the learner 102 to interface with the analysis server 108 via a browser. Additionally or alternatively, the learner module 106 may be configured to perform one or more operations attributed to the analysis module 110. For example, the learner module 106 may generate the domain knowledge structure 140 based on the learning materials or some portion thereof. The domain knowledge structure 140 may be stored at the learner device 104 or another suitable storage location (e.g., cloud storage, a storage server, etc.).

The learning materials server 114 may include a hardware server that includes a processor, memory, and communication capabilities. In the illustrated embodiment, the learning materials server 114 may be coupled to the network 122 to send and receive data to and from the learner device 104 and the analysis server 108 via the network 122. Additionally, the learning materials server 114 may be coupled to the network 122 such that the analysis module 110 may access the learning material metadata 132 and/or the learning materials 130.

The learning materials server 114 may be configured to host and/or store the learning materials 130 and the learning material metadata 132. The learning materials 130 may be organized according to a course to which the learning materials 130 pertain. The learning material metadata 132 may include metadata from the learning materials 130. Some examples of the learning material metadata 132 may include a course title, a course number, a date or dates of the course, a professor, an institute, the syllabus, a title of one of the learning materials 130 such as the notes, and the text of the learning materials 130.

The learning materials 130 may include academic course materials, syllabi, videos, example problems/solutions, lecture notes, lecture note slides, corresponding list, video transcripts, electronic books (e-books), seminars, and the like. The learning materials 130 may include or constitute open courseware (OCW), massive online open courses (MOOC), sparsely distributed learning materials such as course pages on professors' personal homepages, or any combination thereof.

The learning materials server 114 may be associated with an educational entity 138. The educational entity 138 may upload or otherwise make available the learning materials 130 and the learning material metadata 132. For example, the educational entity 138 may include a university and/or an education platform. Additionally, the educational entity 138 may include a professor or a department administrator.

For example, the educational entity 138 may include a university or another entity providing open education materials such as OCW. Examples may include the OCW provided by Massachusetts Institute of Technology (MIT) or Tokyo Institute of Technology (TIT). Moreover, the educational entity 138 may include an educational platform that hosts the MOOC such as Coursera, EdX, Udacity, and Futurelearn. Additionally, the educational entity 138 may include a professor or the department administrator that contributes a course webpage, which may be crawled and stored on the learning materials server 114.

In some embodiments, the educational entity 138 may include an entity that is not directly associated with providing educational resources. For instance, the educational entity 138 may include publisher of e-books or a website that hosts videos or images. Examples of these types of educational entities 138 may include YOUTUBE®, an e-book distribution website, and online library, an online digital media store, etc.

The analysis server 108 may include a hardware server that includes a processor, a memory, and network communication capabilities. In the illustrated embodiment, the analysis server 108 may be coupled to the network 122 to send and receive data to and from the learner device 104 and/or the learning materials server 114 via the network 122. The analysis server 108 may include the analysis module 110. The analysis module 110 may be configured to analyze the learning materials 130 and the learning material metadata 132. Additionally, the analysis module 110 may be configured to interact with the learner module 106 to analyze the learning materials 130 and the learning material metadata 132 and/or provide the domain knowledge structure 140 to the learner 102.

In some embodiments, the analysis module 110 may be configured to generate the domain knowledge structure 140. In some embodiments, the analysis module 110 may act in part as a thin-client application that may be stored on a computing device, such as the learner device 104, and in part as components that may be stored on the analysis server 108, for instance. In some embodiments, the analysis module 110 may be implemented using hardware including a processor, a microprocessor (e.g., to perform or control performance of one or more operations), a field-programmable gate array (FPGA) or an application-specific integrated circuit (ASIC). In some other instances, the analysis module 110 may be implemented using a combination of hardware and software.

The analysis module 110 may generate the domain knowledge structure 140 with minimal or no manual actions taken by an individual. For example, in the learning environment 100, the analysis module 110 may crawl the learning materials 130. While crawling, the learning materials 130, the analysis module 110 may identify, scan and copy content of the learning materials 130 and may extract the learning material metadata 132.

The analysis module 110 may extract structural information by analyzing the learning materials 130 and the learning material metadata 132. Generally, the structural information may indicate general organization and general content of the learning materials 130. In some circumstances, the learning materials 130 may not be well organized. Additionally, in embodiments in which the learning materials 130 include a MOOC, the learning materials 130 may include a wide variety of information that may relate to multiple sparsely distributed courses. Nevertheless, the analysis module 110 may find structured or semi-structured information during crawling and may extract the structured or semi-structured information.

The analysis module 110 may then generate segmented term sequences from the extracted lists and the page-format analysis. The segmented term sequences may be bounded according to the detected sequence borders. The segmented term sequences may include positional information indicating a position in the learning materials 130 of one or more of the segmented term sequences.

The analysis module 110 may also extract knowledge points from the learning materials 130 and the learning material metadata 132. In some embodiments, the analysis module 110 may derive candidate knowledge points from the segmented term sequences. For example, the analysis module may process the segmented term sequences to derive the knowledge points from the segmented term sequences. The analysis module 110 may also construct a hierarchy of the knowledge points.

Hierarchy relationships between the knowledge points may then be inferred. The hierarchy relationship between a first knowledge point and a second knowledge point may include a determination as to whether the first knowledge point is broader (e.g., having a coarser granularity), narrower (e.g., having a finer granularity), or includes a similar granularity to the second knowledge point. For example, the first knowledge point may include "supervised learning" and the second knowledge point may include "machine learning." Thus, a hierarchy relationship between the first knowledge point and the second knowledge point may include the first knowledge point being narrower (or having a finer granularity) than the second knowledge point.

Dependency relationships between knowledge points may be inferred. The dependency relationship between a first knowledge point and a second knowledge point may include a determination whether the first knowledge point contributes or otherwise should be learned prior to the second knowledge point, the first knowledge point may be learned concurrently with the second knowledge point, or the second knowledge point contributes or otherwise should be learned prior to the first knowledge point. For example, the concept of logistic regression contributes to an understanding of neural networks. Accordingly, a dependency relationship may be determined between the concept neural networks and the concept of logical regression.

The analysis module 110 may then align one or more of the knowledge points with one or more of the learning materials 130. The aligned learning materials may be based on granularity of a particular knowledge point. For example, a broad knowledge point may be linked to broader or larger learning material and a narrow knowledge point may be linked to a more distinct or smaller portion of the learning materials 130. The analysis module 110 may then generate the domain knowledge structure 140. The domain knowledge structure 140 may include the extracted knowledge points organized at least partially according to the extracted inferred hierarchy and dependency relationships and including the aligned learning materials.

Modifications, additions, or omissions may be made to the learning environment 100 without departing from the scope of the present disclosure. Specifically, embodiments of the learning environment 100 are depicted in FIG. 1 as including one learner 102, one learning materials server 114, one learner device 104, and one analysis server 108. However, the present disclosure applies to a learning environment 100 including one or more learners 102, one or more learning materials servers 114, one or more learner devices 104, and one or more analysis servers 108, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In the learning environment 100, memory such as memory in the learner device 104, the analysis server 108, and the learning materials server 114 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
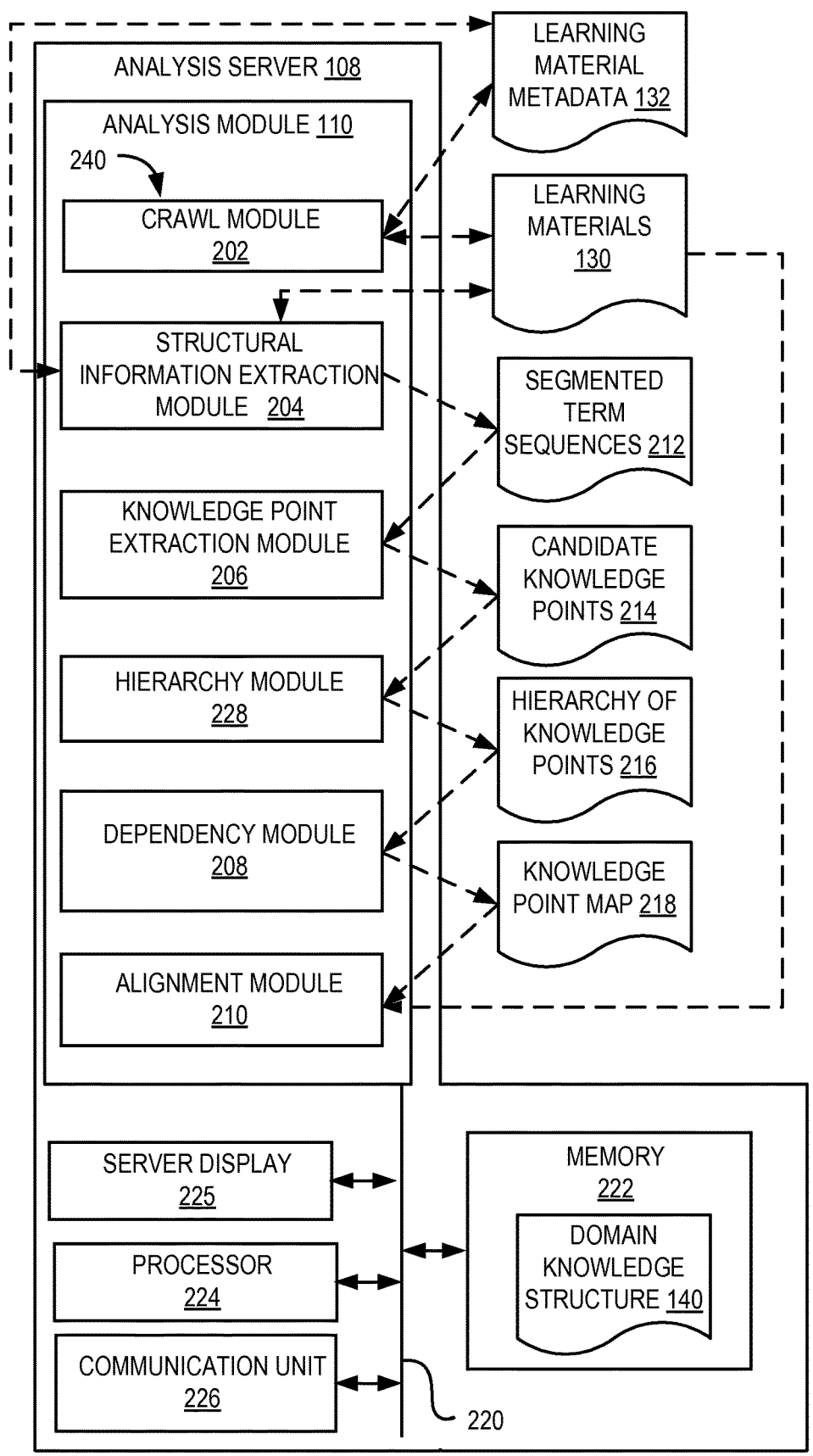
FIG. 2 is a block diagram of an example source analysis server that may be implemented in the personalized learning environment of FIG. 1.

FIG. 2 illustrates an example of the analysis server 108 including an example of the analysis module 110. The analysis server 108 of FIG. 2 includes the analysis module 110, a processor 224, a memory 222, a server display 225, and a communication unit 226. The components (110, 222, 224, and 226) of the analysis server 108 may be communicatively coupled by a bus 220.

The processor 224 may include an arithmetic logic unit (ALU), a microprocessor, a general-purpose controller, or some other processor array to perform computations and software program analysis. The processor 224 may be coupled to the bus 220 for communication with the other components (e.g., 110, 222, and 226). The processor 224 generally processes data signals and may include various computing architectures including a complex instruction set computer (CISC) architecture, a reduced instruction set computer (RISC) architecture, or an architecture implementing a combination of instruction sets. Although in FIG. 2 the analysis server 108 is depicted as including a single processor 224, multiple processors may be included in the analysis server 108. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from at least one of the learning materials server 114 and the learner device 104, and the analysis server 108 depending upon where the analysis module 110 is stored. The communication unit 226 may be coupled to the bus 220. In some embodiments, the communication unit 226 includes a port for direct physical connection to the network 122 or to another communication channel. For example, the communication unit 226 may include a USB, SD, CAT-5, or similar port for wired communication with the components of the learning environment 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a wired port and a wireless transceiver. The communication unit 226 may also provide other conventional connections to the network 122 for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 226 may include a cellular communications transceiver for sending and receiving data over a cellular communications network including via SMS, MMS, HTTP, direct data connection, WAP, e-mail, or another suitable type of electronic communication.

The server display 225 may include any hardware device that receives data and information from one or more of the processor 224, the memory 222, and the communication unit 226 via the bus 220. Some examples of the server display 225 may include a CRT display, a LED display, an electroluminescent display, an LCD, or another suitable display. In some embodiments, the server display 225 may receive input from a learner (e.g., the learner 102 of FIG. 1) and communicate the input to one or more of the processor 224, the memory 222, and the communication unit 226 via the bus 220.

In the illustrated embodiment of FIG. 2, the analysis module 110 may include a crawl module 202, a structural information extraction module 204, a knowledge point extraction module 206, a hierarchy module 228, a dependency module 208, and an alignment module 210 (collectively, the modules 240). Each of the modules 240 may be implemented as software including one or more routines configured to perform one or more operations. The modules 240 may include a set of instructions executable by the processor 224 to provide the functionality described herein. In some instances, the modules 240 may be stored in or at least temporarily loaded into the memory 222 of the analysis server 108 and may be accessible and executable by the processor 224. One or more of the modules 240 may be adapted for cooperation and communication with the processor 224 and components of the analysis server 108 via the bus 220.

The crawl module 202 may be configured to crawl the learning materials 130 and/or extract the learning material metadata 132. For example, the crawl module 202 may perform operations performed by a web crawler, a web spider, an ant, an automatic indexer, a web scutter, or another suitable bot. The crawl module 202 may copy pages or some data included therein that the crawl module 202 visits and/or communicate information and data included in crawled learning materials 130 and/or extracted the learning material metadata 132 to the analysis module 110.

In some embodiments, the learning materials 130 and/or the learning material metadata 132 or some portion thereof may be communicated to the analysis module 110. For example, with reference to FIGS. 1 and 2, the learning materials server 114 may communicate the learning materials 130 to the analysis server 108. One or more of the other modules 240 may accordingly access data included in the learning materials 130 and/or the learning material metadata 132. Additionally, in some embodiments, the one or more of the learning materials 130 and/or the learning material metadata 132 may be identified and/or extracted as described in U.S. application Ser. No. 13/732,036, entitled: "Specific Online Resource Identification And Extraction," filed Dec. 31, 2012, which is incorporated herein by reference in its entirety.

The structural information extraction module 204 may be configured to extract structural information from the learning materials 130 and/or the learning material metadata 132, which may indicate general organization and content of the learning materials 130. For instance, the structural information extraction module 204 may extract lists of syllabi, lecture notes, and tables of contents, etc. included in the learning materials 130. The structured information in the lists may relate to the granularity and general organization of the information included in the learning materials 130. For example, a table of contents may include candidate knowledge points (e.g., the headings, subheadings, etc.) and may indicate which knowledge points have a similar granularity (e.g., each subheading may include a similar granularity).

Figure 3A:
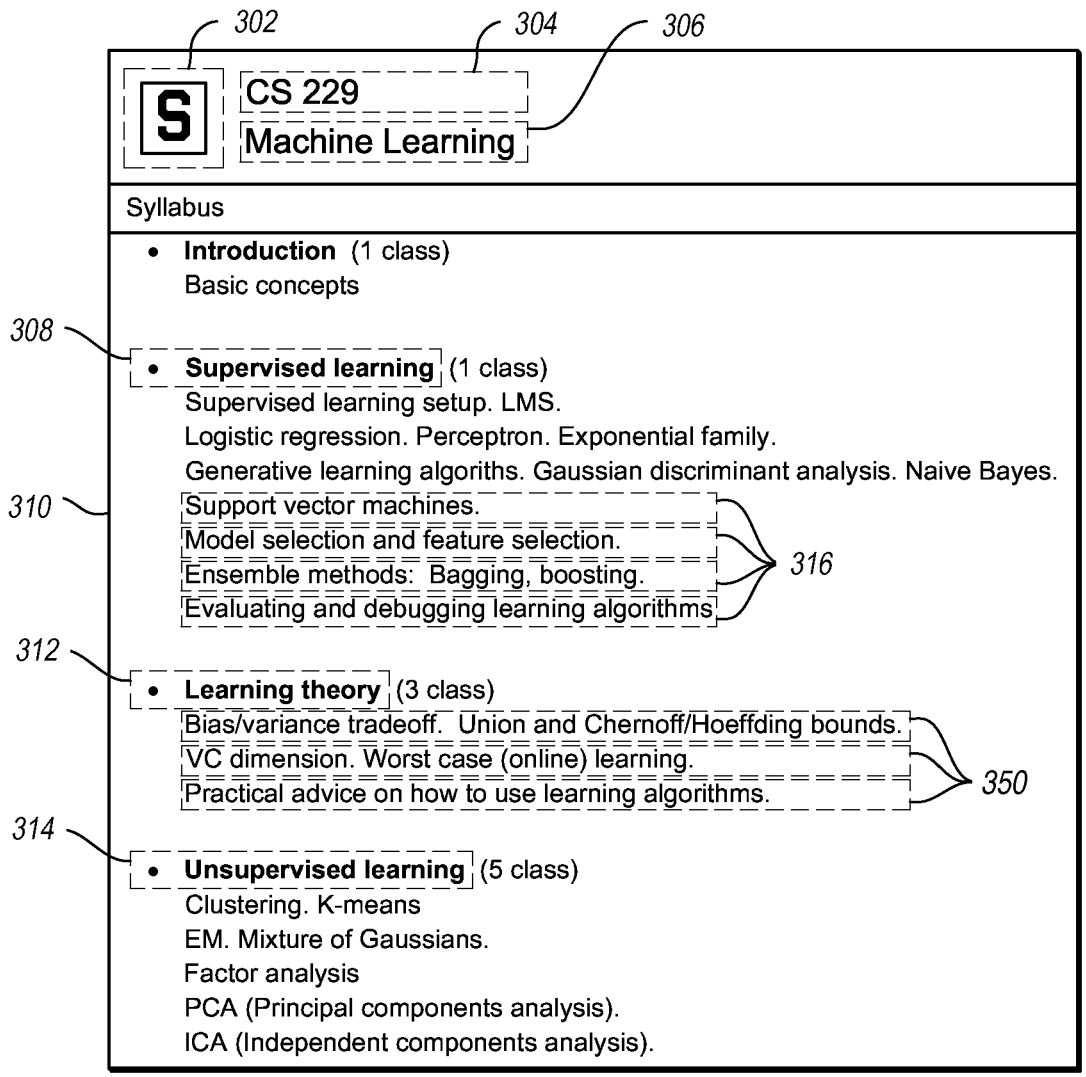
FIG. 3A illustrates an example online learning material that may be analyzed in the personalized learning environment of FIG. 1.

For example, with reference to FIGS. 3A and 3B, an example syllabus 310 and an example lecture note list 336 are illustrated. The syllabus 310 and the lecture note list 336 may include examples of the learning materials 130 that include various structural or semi-structural information that the structural information extraction module 204 of FIG. 2 may extract. The syllabus 300 may include an institution indicator 302, a course number 304, a course title 306, which may be examples of learning course metadata such as the learning course metadata 132 of FIG. 1. In the syllabus 300, the institution indicator 302, the course number 304, the course title 306 may indicate general information of a course to which the syllabus 310 belongs.

Additionally in the syllabus 310, a first top level topic of machine learning course may include "supervised learning," a second top level topic may include "learning theory," and a third top level topic may include "unsupervised learning," which are depicted by topic headings 308, 312, and 314, respectively. Moreover, some sub-topics related to the first top level topic of supervised learning may include "support vector machines," "model selection and feature selection," ensemble methods: Bagging, boosting," and "evaluation and debugging learning algorithms," as depicted by sub-topics 316 that appear under the topic heading 308. Likewise, sub-topics related to the second top level topic learning theory are depicted by sub-topics 350 that appear under the topic heading 312.

Referring to FIG. 3B, in the lecture note list 336, a list of lecture notes 334 may include lecture notes that relate to the sub-topics (e.g., 316 and 350 of FIG. 3A) of a course on machine learning. From the list of lecture notes 334 and the syllabus 310, the structural information extraction module 204 of FIG. 2 may ascertain the granularity of the sub-topics and generally organizational information. For example, the structural information extraction module 204 may ascertain that concepts of "support vector machines" "supervised learning," "learning theory," and "VC dimension" are concepts that are related to machine learning. Additionally, the structural information extraction module 204 may ascertain that "supervised learning" and "learning theory" are of a first granularity and that "support vector machines" and "VC dimension" are of a second granularity. Additionally still, the structural information extraction module 204 may ascertain that "support vector machines" is a sub-topic of "supervised learning" and that "VC dimension" is a sub-topic of "learning theory."

Referring back to FIG. 2, the structural information extraction module 204 may also conduct a page-format analysis of one or more pages of the learning materials 130. The page-format analysis may examine the pages for indications of structural information in the learning materials 130 and/or the learning material metadata 132.

Figure 3C:
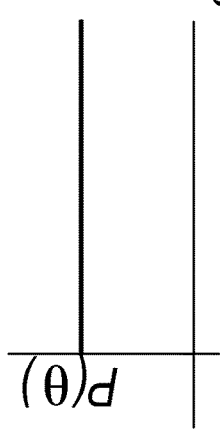
FIG. 3C illustrates another example online learning material that may be analyzed in the personalized learning environment of FIG. 1.

For example, with reference to FIG. 3C, an example lecture slide 330 is illustrated. The lecture slide 330 may be an example of the learning materials 130 of FIGS. 1 and 2. The lecture slide 330 may be analyzed by the structural information extraction module 204 of FIG. 2. A title heading 328 of the lecture slide 330 "Prior Distribution" may be extracted. Additionally, a subheading 332 "Conjugate priors:" and/or a term 352 "posterior" included in the lower level may be extracted. Accordingly, the structural information extraction module 204 may ascertain that the lecture slide 330 generally relates to a concept of prior distribution as indicated by the heading 328. Additionally, the structural information extraction module 204 may ascertain that a concept of "prior distribution" and "posterior" may be related to prior distribution. Moreover, the structural information extraction module 204 may ascertain that the concept of "prior distribution" may have a different granularity than "conjugate priors" and that the term "conjugate priors" may have a finer granularity than "prior distribution."

Referring back to FIG. 2, the structural information extraction module 204 may then generate segmented term sequences 212. The segmented term sequences 212 may be based on the structural information in extracted lists and/or data acquired during page-format analysis. The segmented term sequences may be bounded according to the detected sequence borders, which may be detected by the structural information extraction module 204. The sequence borders may be based on one or more of line breaks, table cell borders, sentence borders, and specific punctuation.

For example, with reference to FIGS. 2 and 3A-3C, the structural information extraction module 204 may detect sequence borders of one or more of the segmented term sequences (e.g., 306, 308, 312, 314, 316, 350, 328, and 332, 334). In particular, with reference to FIG. 3A, the 350 are separated into separate lines, which may include line breaks as a sequence borders. Accordingly, segmented term sequences may include each line of the sub-topics 350. Additionally or alternatively, the structural information extraction module 204 may further detect the period (.) between "Bias/variance tradeoff" and "Union and Chernoff/ Hoeffding bounds" as a sequence border. Likewise, with reference to FIG. 3C, the subheading 332 "Conjugate priors" is detected as a line which has separated borders.

Referring back to FIG. 2, the segmented term sequences may include positional information. The positional information may indicate a position in the learning materials 130 of one or more of the segmented term sequences. For instance, with reference to FIG. 3A, the positional information may specify that levels and locations of segmented term sequences in a web page.

In FIG. 2, the structural information extraction module 204 is depicted as being separate from the crawl module 202. However, in some embodiments, the structural information extraction module 204 may operate concurrently with the crawl module 202. For instance, the structural information extraction module 204 or some portion thereof may be included in the crawl module 202.

The knowledge point extraction module 206 may be configured to extract knowledge points from the learning materials 130 based on the segmented term sequences generated by the structural information extraction module 204. For example, the knowledge point extraction module 206 may unify abbreviations and remove stop phrases in the segmented term sequences.

Generally, unifying abbreviations includes finding the actual term(s) to which an abbreviation (e.g., an acronym, an initialism, a clipping, a reduced compound term, etc.) refers. For example, an abbreviation may include SVD, which may refer to the name singular value decomposition or an abbreviation may include PCA, which refers to the principal component analysis. The abbreviations may be unified using heuristic rules. An example of a heuristic rule may include a rule to extract a phrase followed by a parenthetical to determine whether the parenthetical includes an abbreviation or an acronym for the phrase.

Stop phrases may generally include words that are removed prior to analysis. Some examples of the stop phrases may include domain-specific words such as "lecture" or "notes" as well as general stop words such as "the," or "a."

The knowledge point extraction module 206 may construct a generalized suffix tree of the segmented term sequences. The knowledge point extraction module 206 may be configured to then discover repeated phrase instances from the segmented term sequences. The repeated phrase instances may be quantified in a frequency for each of the segmented term sequences. In some embodiments, the phrase instances may be limited by a particular maximum length.

The knowledge point extraction module 206 may adjust the frequency of the segmented term sequences. The frequencies may be adjusted based on position of phrase instances in the learning materials 130. The position may include a position in one or more particular course materials. For example, the learning materials 130 may include a page of text including the knowledge point. A page layout analysis may be performed on the page, which may assess a structure of the page and where the knowledge point is present in the structure, e.g., a heading, a sub-heading, a title, a picture or table captions, etc.

The knowledge point extraction module 206 may measure a cohesion and/or a separation of the segmented term sequences. Examples of the cohesion and/or the separation may include mutual information and/or border entropy. The cohesion may be measured according to a mutual information cohesion metric and/or the separation may be measured according to an accessor variety separation. Some additional details of the accessor variety separation and the mutual information cohesion are provided in Pierre Magistry and Benoît Sago, *Unsupervised Word Segmentation: The Case for Mandarin Chinese*, PROCEEDINGS OF THE 50TH ANUUAL MEETING OF THE ASSOCIATION FOR COMPUTATIONAL LINGUISTICS, 383-387 (2012), which is incorporated herein by reference in its entirety.

The knowledge point extraction module 206 may generate candidate knowledge points 214 from the segmented term sequences. The hierarchy module 228 may be configured to receive the candidate knowledge points 214 and to construct a hierarchy of knowledge points 216. For example, the hierarchy module 228 may calculate weights of the candidate knowledge points 214 based on the adjusted frequency. The weights may be calculated according to frequencies, source distribution, and an authority of the learning materials 130 in which the segmented term sequences appear. If a knowledge points has high frequency, and has been contained in many different courses, and these courses are offered by authoritative institutes or professors, then the knowledge point has higher weight which reflect its importance. Additionally, the hierarchy module 228 may analyze the appearance positions of the candidate knowledge points 214. The hierarchy module 228 may then construct the hierarchy of knowledge points 216 based on the appearance positions and weights.

In the hierarchy of knowledge points 216, each of the candidate knowledge points 214 may be assigned a hierarchy level. The hierarchy level may correspond to a level of granularity of the knowledge points and may be based on the position of the knowledge points in the learning materials 130. For instance, a first hierarchy level may be assigned to knowledge points in a syllabus or a lecture note title and a second hierarchy level may be assigned to knowledge points in the subtitles or content. In some embodiments, if a knowledge point is found multiple positions and multiple sources, then it may be assigned to multiple hierarchy levels, then the hierarchy module 228 may assign a hierarchy level based on the level distribution of all instances of the knowledge points. The assigned level will be decided by the level of instances of the knowledge point with majority appearance.

The dependency module 208 may receive the hierarchy of knowledge points 216 and infer dependency between the knowledge points. For example, the dependency module 208 may locate positions of one or more instances of the knowledge points in one or more of the learning materials 130. The dependency module 208 may compare relative positions of knowledge points in the learning materials 130. For one or more pairs of knowledge points, the dependency module 208 may decide the relative positions between the two knowledge points in the learning materials 130.

For example, with reference to FIGS. 3A and 3B, the topic heading 308 "supervised learning" includes a relative position higher (e.g., towards the top) on the online learning material than a second topic heading 312 "learning theory." Similarly, in the list of lecture notes 334 of FIG. 3B, the "supervised learning" is related to "Lecture notes 1" and positioned higher on the lecture note list 336 than the "learning theory." Accordingly, the dependency module 208 may infer that the knowledge point "supervised learning" has relative position before the knowledge point "learning theory." Based on some or all of the relative positions inferred among the knowledge points, the dependency module 208 may recommend an immediate dependency relationship among two or more knowledge points. For example, the dependency module 208 may further infer a dependency relationship between the "supervised learning" and "learning theory" (e.g., that it may be beneficial to learn supervised learning prior to learning theory).

From the hierarchy and dependency relationships, the dependency module 208 may generate a knowledge point map 218. The knowledge point map 218 may include the hierarchy and dependency relationships between the knowledge points. The positions of the knowledge points in the knowledge point map 218 may reflect the learning order suggested by a teacher, for instance.

The alignment module 210 may be configured to align one or more of the learning materials 130 with one or more of the knowledge points. The learning materials 130 may be aligned according to the granularity or hierarchy level of the knowledge point. For example, a first knowledge point may include a term in context of a particular page. The term (and the first knowledge point) may accordingly include in a low hierarchy level and a fine granularity. Thus, a first learning material aligned with the first knowledge point may include a specific portion (e.g., one sentence or paragraph) of the particular page that includes the term. Likewise, a second knowledge point may include a syllabus heading. The syllabus heading (and the second knowledge point) may accordingly include in a high hierarchy level and a coarse granularity. Thus, a second learning material aligned with the second knowledge point may include an entire set of lecture notes that describe the second knowledge point The alignment module 210 may align the first learning material with the first knowledge point and the second learning material with the second knowledge point.

In some embodiments, a knowledge point may be aligned with one or more segments of a video such as a lecture video that may be included in the learning materials 130. The video may be segmented and video topics may be as described in U.S. application Ser. No. 14/245,725, entitled: "Topic Identification In Lecture Videos," filed Apr. 4, 2014, which is incorporated herein by reference in its entirety.

For example, the alignment module 210 may precisely locate each of the knowledge points of the knowledge point map 218 in the learning materials 130. The alignment module 210 may then compare and rank the learning materials 130 aligned with each of the knowledge points. Based on the comparison and ranking of the learning materials 130, the alignment module 210 may align particular learning materials 130 with a particular knowledge point.

In some embodiments, the learning materials 130 may be compared and ranked according to a linear combination of a knowledge point score, a general score, and a type factor.

For example, the linear combination may be calculated according to example learning materials alignment equations:

$$a \times KPS + b \times GS + c \times TF$$

$$a+b+c=1$$

In the learning materials alignment equations, a, b, and c represent weights assigned to the knowledge point score, the general score, and the type factor, respectively. The parameter KPS represents the knowledge score, which may be based on the frequency of appearances and positions of each of the knowledge points. The parameter GS may represent the general score. In some embodiments, the general score may be calculated as discussed in U.S. application Ser. No. 13/731,996, entitled: "Ranking And Recommendation Of Open Education Materials," filed Dec. 31, 2012, which is incorporated herein by reference in its entirety. The parameter TF represents the type factor, which may be based on a learner or administrator preference.

Figure 4:
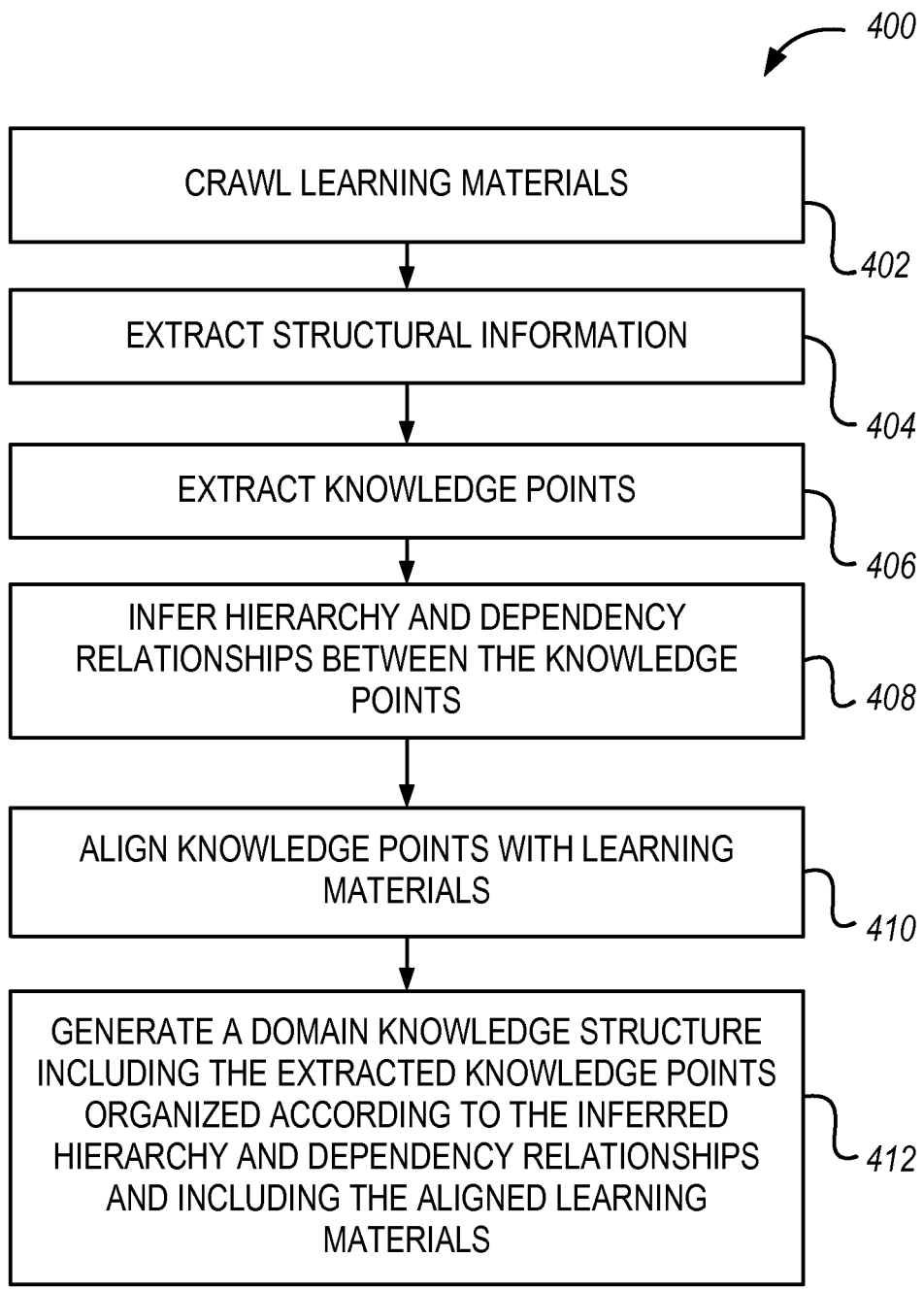
FIG. 4 is a flow diagram of an example method of domain knowledge structure generation.

FIG. 4 is a flow diagram of an example method 400 of generating a domain knowledge structure, arranged in accordance with at least one embodiment described herein. The method 400 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 400. The analysis server 108 may include a processor (e.g., the processor 224 of FIG. 2) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at block 402. At block 402, learning materials may be crawled. Additionally or alternatively, the learning materials may be received. In some embodiment, the learning materials may include one or more of open courseware, MOOC, personal home pages of professors, department home pages, and e-books. While the learning materials are being crawled, one or more of the operations (e.g., 404, 406, 408, 410, and 412) may be performed.

At block 404, structural information may be extracted from the learning materials. Additionally, the structural information may be extracted from learning materials metadata and semi-structural format information. The semi-structural format information may include, for instance, a structure of a syllabus, a list of lecture notes, a structure/format of lecture note slides, video segmentation, and video segments. At block 406, knowledge points may be extracted from the learning materials. At block 408, hierarchy and dependency relationships may be inferred between the knowledge points. At block 410, the knowledge points may be aligned with one or more of the learning materials. In some embodiments, aligning the knowledge points includes precisely locating each of the knowledge points in the learning materials based on granularity of the knowledge point and comparing and ranking the learning materials aligned with specific knowledge points.

At block 412, a domain knowledge structure may be generated including the extracted knowledge points organized at least partially according to the inferred hierarchy and dependency relationships and including the aligned learning materials.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
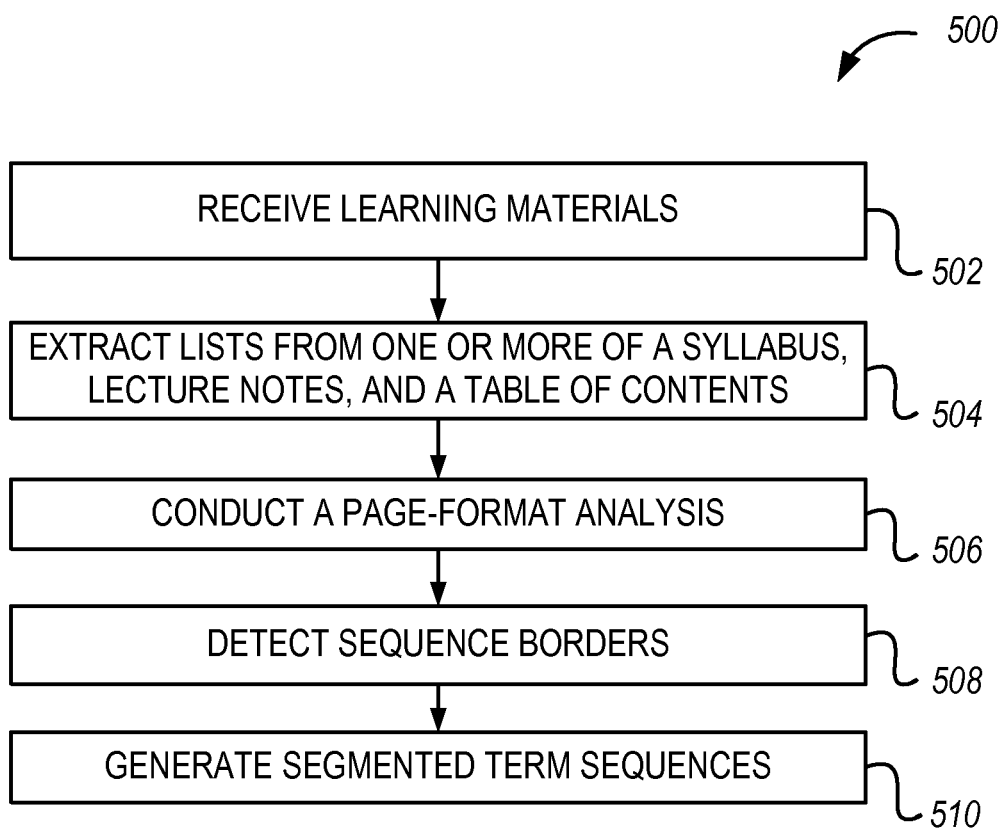
FIG. 5 is a flow diagram of an example method of structural information extraction.

FIG. 5 is a flow diagram of an example method 500 of structural information extraction, arranged in accordance with at least one embodiment described herein. The method 500 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 500. The analysis server 108 may include a processor (e.g., the processor 224 of FIG. 2) that is configured to execute computer instructions to cause or control performance of the method 500. Although illustrated as discrete blocks, various blocks may be divided into additional blocks, combined into fewer blocks, or eliminated, depending on the desired implementation.

The method 500 may begin at block 502 in which learning materials may be received. At block 504, lists may be extracted from one or more of a syllabus, lecture note list, and a table of contents included in the learning materials. At block 506, a page-format analysis may be conducted of one or more pages of the learning materials. At block 508, sequence borders may be detected. The sequence borders may be detected based on one or more of line breaks, table cell borders, sentence borders, and specific punctuation. At block 510, segmented term sequences may be generated. The segmented term sequences may be generated from the lists and the page-format analysis. One or more of the segmented term sequences may be bounded by the detected sequence borders and may include positional information indicating a position in the learning materials (e.g., based on a page analysis). In some embodiments, the learning materials may be crawled. While the learning materials are being crawled, one or more of the operations (e.g., 504, 506, 508, and 510) may be performed.

Figure 6:
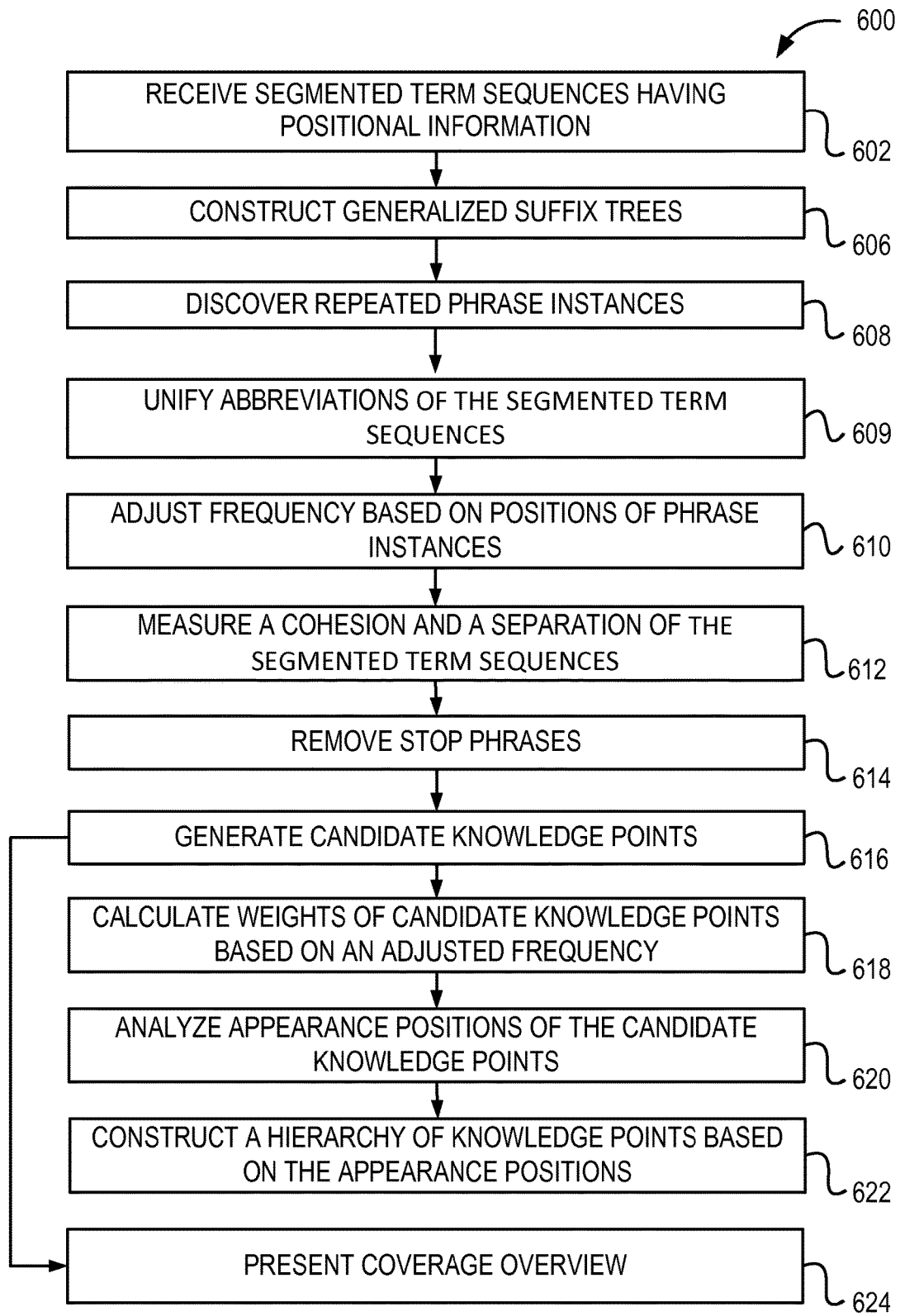
FIG. 6 is a flow diagram of an example method of knowledge point extraction.

FIG. 6 is a flow diagram of an example method 600 of knowledge point extraction, arranged in accordance with at least one embodiment described herein. The method 600 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 600. The analysis server 108 may include a processor (e.g., the processor 224 of FIG. 2) that is configured to execute computer instructions to cause or control performance of the method 600. Although illustrated as discrete blocks, various blocks may be divided into additional blocks, combined into fewer blocks, or eliminated, depending on the desired implementation.

The method 600 may begin at block 602. At block 602, segmented term sequences may be received. The segmented term sequences may have positional information indicating a position in the learning materials of the segmented term sequence. At block 606, generalized suffix trees may be constructed of the segmented term sequences. At block 608, repeated phrase instances may be discovered from the segmented term sequences. The phrase instances may be limited by a particular maximum length. At block 609, abbreviations of the segmented term sequences may be unified. In some embodiments, the abbreviations may be unified using heuristic rules. At block 610, frequency of the discovered repeated phrases instances may be adjusted. The frequency of the discovered repeated phrases may be adjusted based on positions of phrase instances in the learning materials.

At block 612, a cohesion and/or a separation of the segmented term sequences may be measured. The cohesion may be measured according to a mutual information cohesion metric. Additionally or alternatively, the separation may be measured according to an accessor variety separation metric. Performance of a cohesion and/or separation of the segmented term sequences may help filter out some phrases with repeated instances.

At block 614, stop phrases may be removed from the segmented term sequences. At block 616, candidate knowledge points may be generated from the segmented term sequences. From block 616, the method 600 may proceed to block 624 and block 618. At block 624, a coverage overview may be presented. For example, the coverage overview may be presented on a user interface device of a learner device such as a user display. The coverage overview may include appearance distribution in different courses and learning materials and/or the candidate knowledge points. For each knowledge point the overview may show which courses and learning materials contain the current knowledge points, and corresponding appearance and frequency distributions.

At block 618, weights of the candidate knowledge points may be calculated based on the adjusted frequency. In some embodiments, the weight of a knowledge point may be calculated based on total number of appearance frequency and distribution of it appears. For example, if the total frequency of a knowledge point is higher, the number of different courses in which the knowledge point appears is larger, and the number of different learning materials where in which the knowledge point appears is larger, then the weight of the knowledge point may be larger. In some embodiments, weight calculation may be represented by a weight calculation expression:

$$W = a \times TF + b \times CN + c \times LN$$

In the weight calculation expression, a, b, and c are parameters used to adjust relative importance. The parameter TF represents the total of the knowledge point. The parameter W represents the weight. The parameter LN represents a number of different learning materials of the knowledge point. The parameter CN represents a number of different courses of the knowledge point. The weights of knowledge points can be used to find the most common and important knowledge points.

At block 620, appearance positions of the candidate knowledge points may be analyzed. For example, the granularity of the appearance positions may be determined. At block 622, a hierarchy of knowledge points may be constructed based on the appearance positions. The hierarchy levels of one or more of the knowledge points may be based on appearance positions in the learning materials and the granularity of such positions. In some circumstances, two or more hierarchy levels may be assigned to a particular knowledge point based on the appearance positions in the learning materials. For example, the particular knowledge point may appear in learning materials with a fine granularity and a coarse granularity. In response, the hierarchy level may be assigned to the particular knowledge point based on a frequency at which the particular knowledge point appears at each of the granularities. For instance, the granularity at which the knowledge point appears at with the highest frequency may be assigned to the particular knowledge point.

Figure 7:
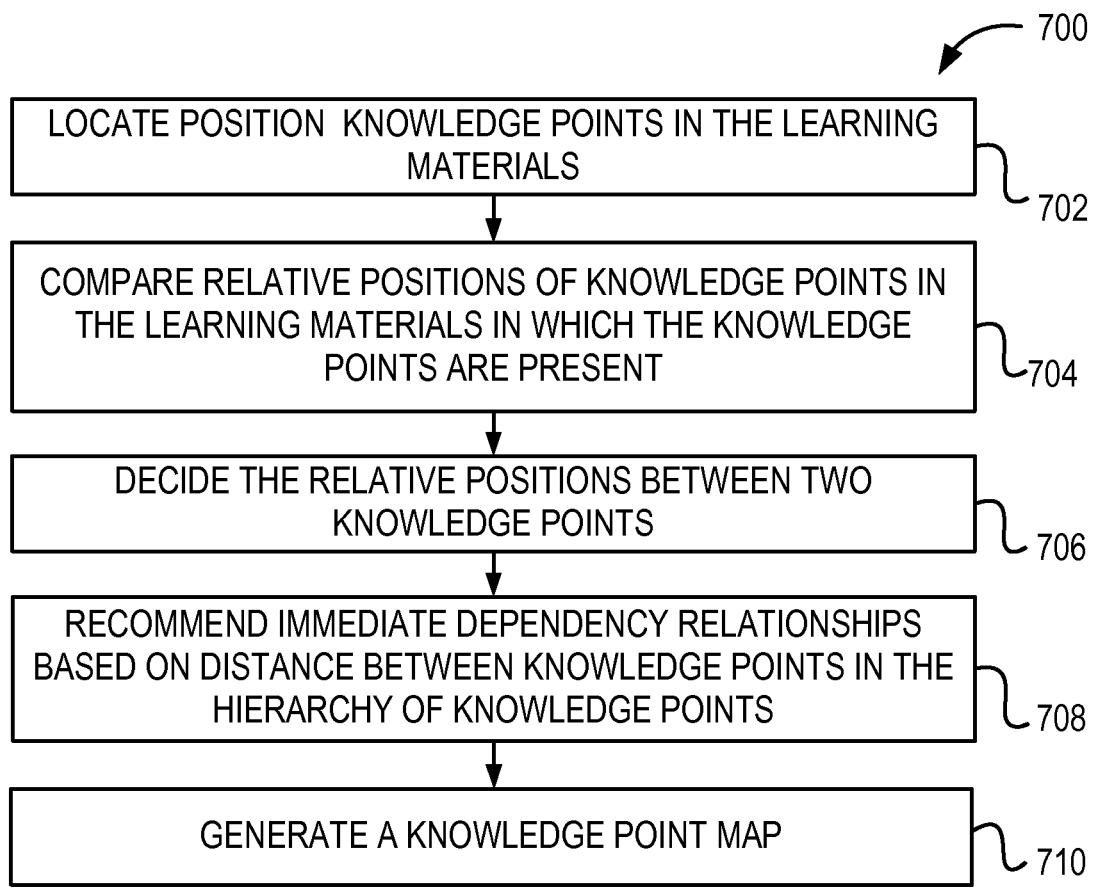
FIG. 7 is a flow diagram of an example method of dependency inference.

FIG. 7 is a flow diagram of an example method 700 of hierarchy and dependency inference, arranged in accordance with at least one embodiment described herein. The method 700 may be programmably performed in some embodiments by the analysis server 108 described with reference to FIGS. 1 and 2. The analysis server 108 may include or may be communicatively coupled to a non-transitory computer-readable medium (e.g., the memory 222 of FIG. 2) having stored thereon or encoded therein programming code or instructions that are executable by a processor to perform or cause performance of the method 700. The analysis server 108 may include a processor (e.g., the processor 224 of FIG. 2) that is configured to execute computer instructions to cause or control performance of the method 700. Although illustrated as discrete blocks, various blocks may be divided into additional blocks, combined into fewer blocks, or eliminated, depending on the desired implementation.

The method 700 may begin at block 702. At block 702, positions of one or more knowledge points may be located in the learning materials. At block 704, relative positions of knowledge points in the learning materials in which the knowledge points are present may be compared. At block 706, relative positions between two knowledge points may be decided. For example, in some embodiments the relative positions may be decided by majority order. At block 708, immediate dependency relationships may be recommended based on distance between the knowledge points in a list or hierarchy of knowledge points. At block 710, a knowledge point map may be generated that is representative of the hierarchy and dependency relationships.

In some embodiments, the knowledge point map may be presented. For example, the knowledge point map may be presented on a server display that may be associated with an analysis server such as the analysis server 108 of FIG. 1. Additionally, the knowledge point map may be presented to a learner. For example, the knowledge point map may be presented on a user interface device such as a user display of a learner device. The learner or other entities may view or otherwise interact with the knowledge point map via user interface devices.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What we claim is:

1. A method of domain knowledge structure generation in online learning materials, the method comprising:
   crawling, by one or more processors, electronic learning materials stored at least temporarily in one or more non-transitory storage media;
   extracting, by the one or more processors, structural information from the electronic learning materials;
   extracting, by the one or more processors, knowledge points from the electronic learning materials based at least partially on an organization of the electronic learning materials as indicated by the extracted structural information;
   locating, by the one or more processors, positions of each of the knowledge points within each of the learning materials;
   comparing, by the one or more processors, relative positions of knowledge points in the learning materials in which the knowledge points are present;
   inferring, by the one or more processors, hierarchy and dependency relationships between the knowledge points based at least partially on the relative positions of the knowledge points;
   aligning, by the one or more processors, one or more of the knowledge points with at least one specific portion of one or more of the learning materials, wherein each of the specific portions include one of the located positions of the corresponding knowledge point within the learning materials; and
   generating, by the one or more processors, a domain knowledge structure including the extracted knowledge points organized at least partially according to the inferred hierarchy and dependency relationships and including the aligned learning materials.

2. The method of claim 1, wherein the learning materials include one or more of open courseware, massive open courses (MOOC), personal home pages, department home pages, and electronic books (e-books).

3. The method of claim 1, wherein the structural information are extracted from learning materials metadata of the electronic learning materials and semi-structured format information included in the electronic learning materials.

4. The method of claim 1, wherein the extracting structural information includes:
- extracting lists from one or more of a syllabus, lecture notes, and a table of contents included in the electronic learning materials;
- conducting a page-format analysis of one or more pages of the electronic learning materials;
- detecting sequence borders based on one or more of line breaks, table cell borders, sentence borders, and specific punctuation; and
- generating segmented term sequences from the lists and the page-format analysis, wherein one or more of the segmented term sequences are bounded by the detected sequence borders include positional information indicating a position in the electronic learning materials of the segmented term sequences.

5. The method of claim 4, wherein the extracting knowledge points includes:
- receiving the segmented term sequences having positional information indicating a position in the electronic learning materials of the segmented term sequence;
- after the receiving the segmented term sequences, unifying abbreviations of the segmented term sequences;
- after the unifying the abbreviations, constructing generalized suffix trees of the segmented term sequences;
- after the constructing the generalized suffix trees, discovering repeated phrase instances of the segmented term sequences using the generalized suffix trees, wherein the phrase instances are limited by a particular maximum length;
- after the discovering the repeated phrase instances, adjusting frequency of the discovered repeated phrases instances based on positions of phrase instances in the learning materials;
- after the adjusting the frequency, measuring a cohesion and a separation of the segmented term sequences;
- after the measuring the cohesion and the separation, removing stop phrases from the segmented term sequences;
- after the removing the stop phrases, generating candidate knowledge points from the segmented term sequences;
- after the generating the candidate knowledge points, calculating weights of the candidate knowledge points based on the adjusted frequency;
- after the calculating the weights, analyzing appearance positions of the candidate knowledge points;
- after the analyzing the appearance positions, constructing a hierarchy of knowledge points based on the appearance positions; and
- after the constructing the hierarchy, presenting coverage overview of the learning materials.

6. The method of claim 5, wherein:
- the cohesion is measured according to a mutual information cohesion metric;
- the separation is measured according to an accessor variety separation metric;
- the abbreviations are unified according to a principal component analysis or a singular value decomposition; and
- the weights are calculated according to a number of appearances and an authority of a particular learning material in which the segmented term sequences appear.

7. The method of claim 5, wherein a hierarchy level of each of the knowledge points is based on a level of granularity of the knowledge points in the learning materials.

8. The method of claim 5, wherein the inferring dependency includes:
- deciding the relative positions between two knowledge points in the learning materials;
- recommending immediate dependency relationships based on distance between the knowledge points in the hierarchy of knowledge points; and
- generating a knowledge point map representative of the dependency relationships.

9. The method of claim 1, wherein the aligning one or more of the knowledge points includes:
- precisely locating each of the knowledge points in the learning materials based on granularity of the knowledge point; and
- comparing and ranking the learning materials aligned with specific knowledge points.

10. The method of claim 9, wherein the learning materials are compared and ranked according to a linear combination of a first weight multiplied by a knowledge point score, a second weight multiplied by a general score, and a third weight multiplied by a type factor.

11. A non-transitory computer-readable medium having encoded therein programming code executable by one or more processors to perform or control performance of operations comprising:
- crawling electronic learning materials stored at least temporarily in one or more non-transitory storage media;
- extracting structural information from the electronic learning materials;
- extracting knowledge points from the electronic learning materials based at least partially on an organization of the electronic learning materials as indicated by the extracted structural information;
- locating positions of each of the knowledge points within each of the learning materials;
- comparing relative positions of knowledge points in the learning materials in which the knowledge points are present;
- inferring hierarchy and dependency relationships between the knowledge points based at least partially on the relative positions of the knowledge points;
- aligning one or more of the knowledge points with at least one specific portion of one or more of the learning materials, wherein each of the specific portions include one of the located positions of the corresponding knowledge point within the learning materials; and
- generating a domain knowledge structure including the extracted knowledge points organized at least partially according to the inferred hierarchy and dependency relationships and including the aligned learning materials.

12. The non-transitory computer-readable medium of claim 11, wherein the learning materials include one or more of open courseware, massive open courses (MOOC), personal home pages, department home pages, and electronic books (e-books).

13. The non-transitory computer-readable medium of claim 11, wherein the structural information are extracted from learning materials metadata of the electronic learning materials and semi-structured format information included in the electronic learning materials.

14. The non-transitory computer-readable medium of claim 11, wherein the extracting structural information includes:
- extracting lists from one or more of a syllabus, lecture notes, and a table of contents included in the electronic learning materials;

conducting a page-format analysis of one or more pages of the electronic learning materials;

detecting sequence borders based on one or more of line breaks, table cell borders, sentence borders, and specific punctuation; and generating segmented term sequences from the lists and the page-format analysis, wherein one or more of the segmented term sequences are bounded by the detected sequence borders include positional information indicating a position in the electronic learning materials of the segmented term sequences.

15. The non-transitory computer-readable medium of claim 14, wherein the extracting knowledge points includes:

receiving the segmented term sequences having positional information indicating a position in the electronic learning materials of the segmented term sequence;

after the receiving the segmented term sequences, unifying abbreviations of the segmented term sequences;

after the unifying the abbreviations, constructing generalized suffix trees of the segmented term sequences;

after the constructing the generalized suffix trees, discovering repeated phrase instances of the segmented term sequences using the generalized suffix trees, wherein the phrase instances are limited by a particular maximum length;

after the discovering the repeated phrase instances, adjusting frequency of the discovered repeated phrases instances based on positions of phrase instances in the learning materials;

after the adjusting the frequency, measuring a cohesion and a separation of the segmented term sequences;

after the measuring the cohesion and the separation, removing stop phrases from the segmented term sequences;

after the removing the stop phrases, generating candidate knowledge points from the segmented term sequences;

after the generating the candidate knowledge points, calculating weights of the candidate knowledge points based on the adjusted frequency;

after the calculating the weights, analyzing appearance positions of the candidate knowledge points;

after the analyzing the appearance positions, constructing a hierarchy of knowledge points based on the appearance positions; and after the constructing the hierarchy, presenting coverage overview of the learning materials.

16. The non-transitory computer-readable medium of claim 15, wherein:

the cohesion is measured according to a mutual information cohesion metric;

the separation is measured according to an accessor variety separation metric;

the abbreviations are unified according to a principal component analysis or a singular value decomposition; and the weights are calculated according to a number of appearances and an authority of a particular learning material in which the segmented term sequences appear.

17. The non-transitory computer-readable medium of claim 15, wherein a hierarchy level of each of the knowledge points is based on a level of granularity of the knowledge points in the learning materials.

18. A non-transitory computer-readable medium having encoded therein programming code executable by one or more processors to perform or control performance of operations comprising:

deciding the relative positions between two knowledge points in the learning materials;

recommending immediate dependency relationships based on distance between the knowledge points in the hierarchy of knowledge points; and generating a knowledge point map representative of the dependency relationships.

19. The non-transitory computer-readable medium of claim 11, wherein the aligning one or more of the knowledge points includes:

precisely locating each of the knowledge points in the learning materials based on granularity of the knowledge point; and comparing and ranking the learning materials aligned with specific knowledge points.

20. The non-transitory computer-readable medium of claim 19, wherein the learning materials are compared and ranked according to a linear combination of a first weight multiplied by a knowledge point score, a second weight multiplied by a general score, and a third weight multiplied by a factor.

* * * * *